Patented Oct. 28, 1952

2,615,932

UNITED STATES PATENT OFFICE 2,615,932

PROCESS FOR MANUFACTURING POROUS CARBON ELECTRODES

Adolf Marko and Karl Kordesch, Vienna, Austria, assignors to Olga Burkli, Zurich, Switzerland No Drawing. Application February 28, 1950, Serial No. 146,928. In Austria March 24, 1949

6 Claims. (Cl. 136—122)

This invention relates to a process for manufacturing porous carbon electrodes, which are depolarized by pure or atmospheric oxygen and are used, e. g., in primary cells.

Various primary cells are known in which a porous body of carbon preferably of active carbon is used as positive electrode, through the pores of which air or pure oxygen enters as a depolarizer to the electrode surface, if desired under increased pressure. In most of these cases a weakly acid or alkaline electrolyte is used and the solvent electrode is made of zinc in general. In all these cells as a rule the current density at the surface of the carbon electrode must not exceed 0.3 ma./sq. cm., or about 1 ma./c. cm. of the effective carbon body, in continuous operation because otherwise the voltage drop would become inadmissibly large. The open-circuit voltage of the conventional carbon electrodes against zinc is about 1.4 v., that is, about 0.2 v. below the theoretically possible value of 1.59 v.

In order to reduce the dimensions of such carbon electrodes and the internal resistance of the primary cell, it has been proposed to combine active carbon with oxidation catalysts, which may be selected, e. g., from among various compounds of manganese, copper, silver, vanadium, uranium, titanium, iron, cobalt, the rare earths, etc., and possibly to combine several of the aforementioned compounds in order to increase their catalytic efficiency. One of these suggestions relates to the impregnation of a carbon electrode body with a solution of the catalyst, and subsequent drying. No satisfactory results, however, have been obtained. An allegedly improved process consists in mixing wood meal with a solution of the catalyst, forming the mix into shapes, and carbonizing the shaped bodies at 800° C. in a current of steam. This process has not found commercial acceptance either.

The process according to the invention leads to porous carbon electrodes with oxygen depolarization which have a substantially improved effectiveness as compared with all known carbon electrodes with oxygen depolarization.

The process according to the invention consists substantially in that the carbon bodies are impregnated with solutions of heat-decomposable, heavy metal salts capable of acting as oxidizing agents, and that the impregnated carbon bodies are heated to temperatures at which the salts decompose with the formation of catalysts, viz. metal or metal compounds having a catalyzing action. It has been found that within the scope of this process the use of mixtures of heavy metal salts is of great importance for obtaining highly effective electrodes. Suitably salts of at least two, preferably of five or more different heavy metals, such as iron, cobalt, nickel, manganese, chromium, copper, silver, gold, platinum, vanadium, thorium, rare earths, etc., are used. Furthermore, if two or more heavy metal salts are used, these salts may have different acid radicals acting as oxidizing agents. For instance also two or more salts of different heavy metals may be used, said salts having different acid radicals. Chiefly to be taken into consideration as heat-decomposable salts of these heavy metals capable of effecting oxidation are the nitrates and nitrites, that is, the salts of nitric or nitrous acids. Other salts of this kind are those of chloric acid, chromic acid, oxalic acid, acetic acid, formic acid, and others. Within the scope of this process the salts of the above-mentioned organic acids, i. e., oxalic acid, acetic acid, and formic acid, are to be considered as oxidizing salts, these salts, when subsequently heated, splitting off $CO_2$ which at elevated temperature oxidizes the carbon. Less useful, however, are the sulphates, which are decomposable only with difficulty. Mixtures of at least two salts of different anions may be used too. The temperature applied, depending on the decomposition temperature of the salts used, is to be selected as low as possible and generally lies between 150 and 400° C. In special cases in which the active compounds formed are resistant to glowing heat, higher temperatures, e. g., of 700° C., may be used for decomposing the salts.

According to a special modification of the invention the carbon bodies, before being impregnated with the heavy metal salts of the kind described, are subjected to a pretreatment with agents which attack the internal surface of the carbon and thus prepare it for the reception of the impregnating solution and for the reactions to be effected by the heat treatment. Examples of such agents are concentrated hydrochloric acid, nitric acid, etc., or mixtures of hydrochloric acid and nitric acid, etc., to which hydrofluoric acid may be added, if desired. According to another embodiment of the invention such agents attacking the internal surface of the carbon can be added to the solutions of the heavy metal salts used in the impregnation step.

It has also been found that the catalytic effect can be enhanced by the participation of earth-alkali salts viz. salts of magnesium, calcium, strontium, barium and beryllium, or of aluminium salts or of mixtures of several or all of these salts in the impregnation. These additional salts are also used in the form of their heat-decomposable compounds capable of effecting oxidation. Also in this case the active carbon may be treated with agents attacking the inner surface of the carbon before the impregnation or such agents may be added to the said solution of heavy metal salts containing in addition at least one salt of an earth alkali or aluminium.

As compared with the known electrodes the electrodes according to the invention show a surprisingly enhanced effectiveness. It is possible, e. g., to achieve with air depolarization a continuous current density from 10 ma./sq. cm. to 30 ma./sq. cm. Hence, the electrodes are much smaller for the same output, and much more efficient for the same size, than the known electrodes. Moreover, the electrodes according to the invention have the remarkable property of being reversible, giving when connected against a hydrogen electrode the theoretical open-circuit voltage of 1.23 v.; accordingly against zinc the theoretical open-circuit voltage of 1.59 v. is obtained. These values are based on the assumption that the electrode is dry, that is, not soaked through by the electrolyte. In the moistened condition the reversible $HO_2$-voltage of 1.47 v. against zinc is obtained in a 5 to 6 normal sodium lye. Not being subject to consumption the electrodes may be used permanently and may be employed, e. g., in dry or wet primary cells with alkaline electrolytes.

In making the electrodes preferably carbon having micro-porous structure is used as a raw material. Commercially available arc-lamp carbon, e. g., type A of Siemens-Plania cored carbon, solid carbon of Siemens-Plania and cored or solid carbon of Lorraine having proved well for this purpose. Macro-porous carbon and carbon with high content of graphite or slag is less suitable. Suitably carbon bodies are used which have a central bore which ensures a good soaking through of the entire body with the catalyst solution and later, when the carbon is used in primary cells, permits the access of air or oxygen. Suitably the commercial carbon is freed, e. g. by being glowed through, if desired in a stream of $CO_2$ from any impurities before being processed and subjected as explained above to a pretreatment with surface-attacking agents.

Subsequently the carbon is impregnated, preferably in that the salt solutions are either sucked through the pores of the carbon bodies by reduced pressure or pressed into the pores by increased pressure. The central bore of the carbon bodies facilitates the complete soaking through of the carbon bodies with the salt solution. After being soaked the carbon bodies are heated for a prolonged period of time to the decomposition temperature of the heavy metal salts so that the salts are transformed into active metals or metal compounds. When salts such as the nitrates are used for the impregnation which on decomposing yield compounds attacking the surface of the carbon, the inside surface of the carbon is activated during said step.

The thus obtained carbon bodies may be used, e. g., in primary cells together with an alkaline electrolyte and with zinc as a solvent electrode. If the supply of the depolarizing oxygen or of the air to the electrode takes place under normal atmospheric pressure, measures must be taken to prevent the entry of the liquid electrolyte into the porous passages of the carbon body. For this purpose the electrodes may be provided in the manner known with a water repellent coating, e. g., of paraffin. If the electrodes are used in elements to which air or pure oxygen is supplied under increased pressure, this measure may be omitted, if desired.

Example 1

A cylindrical body of arc-lamp carbon, having a diameter of 15 mm., and a height of 100 mm., with a 6 mm. diameter central bore, is glowed through in a dry condition at temperatures of 900° C. and subsequently treated for several hours with 50% aqueous nitric acid. The thus pretreated carbon body is heated to 400° C. for drying. The impregnation of the carbon body is carried out with a solution composed as follows, which is sucked through the carbon body:

10.0 g. of silver nitrate,
5.0 g. of iron nitrate,
1.0 g. of copper nitrate,
0.1 g. of ammonium vanadate,
100.0 g. of water.

The carbon body impregnating with this heavy metal salt solution is heated to a temperature of 300° C. whereby the metal salts contained in the above mentioned solution decompose and form catalytically effective metals and metal compounds. If desired the electrode is immersed in a solution of paraffin in volatile solvents, which are driven away subsequently. The thus manufactured electrode may be used in a primary cell with oxygen or air depolarization.

Example 2

The carbon electrode glowed through as set forth in Example 1 is impregnated with a solution composed as follows:

3.0 g. of manganese nitrate,
4.7 g. of copper nitrate,
3.6 g. of aluminium nitrate,
1.0 g. of silver nitrate,
100.0 g. of water.

The impregnated carbon electrode is heated at the air to between 300 and 350° C. and is ready for use after having been treated with paraffin.

Example 3

An electrode which has been glowed through and pretreated with nitric acid as set forth in Example 1 is impregnated with a solution composed as follows:

5 g. of nickel formate,
1 g. of silver formate,
100 g. of water.

The impregnated carbon body is heated to a temperature of 200° C. and, if desired, paraffined.

Example 4

A solution of 1.5 g. of cobalt nitrate and 3.5 g. of aluminium nitrate in 100 g. of water is used for the impregnation. The carbon body impregnated with this solution is heated to 700° C. and after cooling is paraffined.

Further solutions, which may be used for the impregnation of a carbon body after pretreatment as set forth in Example 1, if desired, are:

Example 5

5.10 g. $AgNO_3$,
2.90 g. $Co(NO_3)_2$,
4.29 g. $Mn(NO_3)_2.6H_2O$,
30.00 g. $Al(NO_3)_3.9H_2O$,
Rest to 100 g. distilled water.

Example 6

1.65 g. Mn(NO$_3$)$_2$.6H$_2$O,
0.91 g. Cu(NO$_3$)$_2$.3H$_2$O,
0.53 g. Co(NO$_3$)$_2$,
0.074 g. AgNO$_3$,
8.65 g. Al(NO$_3$)$_3$.9H$_2$O,
Rest to 50 g. distilled water.

Example 7

1.45 g. Ni(NO$_3$)$_2$,
3.75 g. Al(NO$_3$)$_3$.9H$_2$O,
Rest to 100 g. distilled water.

Example 8

5.0 g. AgNO$_3$,
11.9 g. Mn(NO$_3$)$_2$.6H$_2$O,
8.25 g. Cu(NO$_3$)$_2$.3H$_2$O,
Rest to 100 g. distilled water.

Example 9

2.8 g. H$_2$(PtCl$_6$),
2.2 g. K$_2$(PdCl$_6$),
0.6 g. Mn(NO$_3$)$_2$.6H$_2$O,
1 ccm. HNO$_3$ conc.,
0.2 g. NH$_4$VO$_3$,
Rest to 100 g. distilled water.

The carbons impregnated with solutions according to Examples 5, 6 and 7 are heated to 800° C., whilst with the solutions according to Example 8 or 9 a heating temperature of 400° C. will suffice. After cooling the impregnated carbon bodies may be paraffined, if desired.

The carbon electrodes made according to the above examples are reversible and give a load capacity which, assuming air depolarization, is at least ten to thirty times higher than the load capacity of the known electrodes. If the depolarization is carried out with pure oxygen the load capacity is increased 150-fold, that is, to about five times the load capacity achievable with air depolarization. The electrodes need not be paraffined if the air or oxygen is supplied to the electrodes under pressure.

While the invention has been shown in the particular embodiments described it is not limited thereto, as modifications thereof may be made without departing from the scope of the appended claims.

What we claim is:

1. In a process for manufacturing porous carbon electrodes for use in oxygen depolarized primary cells the steps of impregnating porous carbon bodies with a solution of at least two heat-decomposable salts having different cations selected from the group consisting of iron, cobalt, nickel, manganese, chromium, copper, silver, gold, platinum, vanadium, thorium and the rare earths, said salts being capable of acting as oxidising agents on the carbon, and heating the impregnated carbon bodies to temperatures adapted to decompose the said salts with the formation of catalysts within said carbon bodies.

2. In a process for manufacturing porous carbon electrodes for use in oxygen depolarized primary cells the steps of treating porous carbon bodies with agents capable of attacking carbon, thereafter impregnating said bodies with a solution of at least two heat-decomposable salts having different cations selected from the group consisting of iron, cobalt, nickel, manganese, chromium, copper, silver, gold, platinum, vanadium, thorium and the rare earths, said salts being capable of acting as oxidising agents on the carbon, and heating the impregnated carbon bodies to temperatures adapted to decompose the said salts with the formation of catalysts within said carbon bodies.

3. In a process for manufacturing porous carbon electrodes for use in oxygen depolarized primary cells the steps of impregnating porous carbon bodies with a solution of at least two heat-decomposable salts having different cations selected from the group consisting of iron, cobalt, nickel, manganese, chromium, copper, silver, gold, platinum, vanadium, thorium and the rare earths, said salts being capable of acting as oxidising agents on the carbon, the said solution containing agents capable of attacking carbon, and heating the impregnated carbon bodies to temperatures adapted to decompose the said salts with the formation of catalysts within said carbon bodies.

4. In a process for manufacturing porous carbon electrodes for use in oxygen depolarized primary cells the steps of impregnating porous carbon bodies with a solution of at least two heat-decomposable salts having different cations selected from the group consisting of iron, cobalt, nickel, manganese, chromium, copper, silver, gold, platinum, vanadium, thorium and the rare earths, said salts being capable of acting as oxidising agents on the carbon, said solution containing in addition at least one salt of an earth alkali metal, and heating the impregnated carbon bodies to temperatures adapted to decompose the said salts with the formation of catalysts within said carbon bodies.

5. In a process for manufacturing porous carbon electrodes for use in oxygen depolarized primary cells the steps of impregnating porous carbon bodies with a solution of at least two heat-decomposable salts having different cations selected from the group consisting of iron, cobalt, nickel, manganese, chromium, copper, silver, gold, platinum, vanadium, thorium and the rare earths, said salts being selected from the group consisting of the nitrates, nitrites, chromates, chlorates, oxalates, acetates and formates of the said heavy metals, and heating the impregnated carbon bodies to temperatures adapted to decompose the said salts with the formation of catalysts within said carbon bodies.

6. An oxygen depolarized electrode for a primary cell manufactured according to the process of claim 1.

ADOLF MARKO.
KARL KORDESCH.

REFERENCES CITED

The following references are of record in the file of this patent:

UNITED STATES PATENTS

| Number | Name | Date |
|---|---|---|
| 646,652 | Markey | Aug. 28, 1900 |
| 1,178,546 | Snyder | Apr. 11, 1916 |
| 1,673,198 | Martus et al. | June 12, 1928 |
| 2,120,618 | Martus et al. | June 14, 1938 |
| 2,164,755 | Marhenkel | July 4, 1939 |
| 2,221,106 | Portail | Nov. 12, 1940 |
| 2,282,098 | Taylor | May 5, 1942 |
| 2,315,346 | Mitchell | Mar. 30, 1943 |
| 2,462,055 | Herwig | Feb. 22, 1949 |
| 2,512,362 | Moberly | June 20, 1950 |